United States Patent [19]

Rhodes

[11] 4,200,497
[45] Apr. 29, 1980

[54] SPARGED AIR DISTILLED WATER RECOVERY SYSTEM

[76] Inventor: William A. Rhodes, 4421 N. 13th Pl., Phoenix, Ariz. 85014

[21] Appl. No.: 971,413

[22] Filed: Dec. 20, 1978

[51] Int. Cl.² .......................... C02B 1/06; B01D 3/00
[52] U.S. Cl. ..................................... 202/197; 202/234; 202/236; 203/10; 203/49; 203/90; 203/DIG. 17
[58] Field of Search ...................... 203/10, 11, 90, 49, 203/40, DIG. 17; 202/236, 234, 197, 181; 126/271; 159/1 S

[56] References Cited

U.S. PATENT DOCUMENTS

| | | | |
|---|---|---|---|
| 957,686 | 5/1910 | Kalb | 159/4 E |
| 957,850 | 5/1910 | Kalb | 159/4 E |
| 1,493,756 | 5/1924 | LaBour | 203/90 |
| 2,902,414 | 9/1959 | Schmerzler | 203/49 |
| 2,904,509 | 9/1959 | Helmers | 202/197 |
| 3,192,130 | 6/1965 | Pottharst | 202/160 |
| 3,278,396 | 10/1966 | Parson | 202/234 |
| 3,522,151 | 7/1970 | Dismore | 203/49 |
| 3,565,767 | 2/1971 | Light | 203/49 |
| 3,642,583 | 2/1972 | Greenberg | 203/49 |
| 3,852,162 | 12/1974 | Light | 203/49 |
| 4,110,172 | 8/1978 | Spears | 202/234 |

FOREIGN PATENT DOCUMENTS

964504 12/1956 Fed. Rep. of Germany ............. 203/49
2059415 6/1971 Fed. Rep. of Germany .

Primary Examiner—Wilbur L. Bascomb, Jr.
Attorney, Agent, or Firm—Don J. Flickinger

[57] ABSTRACT

A sparged air distilled water recovery system comprising a closed tank having spaced end walls. Passing through one end wall is a conduit that is connected at one end to a source of supply of water under pressure and terminating in a jet nozzle. An overflow drain is mounted in the opposite end wall and maintains substantially constant the level of water in the tank. A closed vapor and air circulating system extends from the end wall having the overflow drain to the end wall in which the jet nozzle is mounted. This system comprises a tube having one end mounted in the end wall with the overflow and which end is open at a level above the water in the tank. Included in this tube is a blower for circulating the mixture of water vapor and air. The other end of this tube then enters a condenser at one end while a second tube extends from the other end of the condenser to the end wall in which the jet nozzle is mounted. Air from this second tube enters the tank above the water level under moderate velocity which is dissipated by impinging on a baffle extending across the tank above the water level. An outlet for distilled water is mounted on the bottom of the condenser and extends to a desired receptacle or place of useage.

5 Claims, 2 Drawing Figures

SPARGED AIR DISTILLED WATER RECOVERY SYSTEM

The present invention relates to the distillation of water for purification purposes such as desalination and is concerned primarily with such a system in which sparged air is introduced into a body of water close to the surface thereof where it generates a plurality of bubbles which pass to the surface of the water and entrain vapor to form a mixture of air and water vapor which is conducted to a condenser from which distilled water is drained.

BACKGROUND OF THE INVENTION

At the present time, the broad problem of purifying water and particularly desalinating water is meeting with a large amount of attention from engineers, inventors and research workers. Thus it is known to introduce air and water vapor under pressure into a mixing chamber and to circulate the mixture of air and vapor through a system including a condenser and in which some of the air is recovered from the condenser and returned to the mixing chamber under pressure. The idea of delivering water under pressure through a jet nozzle into a closed tank and maintaining the level of water in the tank constant, together with returning air from a condenser and dissipating the pressure thereof so as to cause the jet of water to enter the body of water at a distance substantially constant from its level so as to produce a multiplicity of small bubbles which rise to the surface of the water, is not to be found in the above-described prior art system.

Before this application was prepared for filing in the Patent Office, a patentability search was conducted which brings to light the following patents as those which are believed to come closest to the subject system and are the closest references of which the Applicant is aware:

| 3,565,767 | Light | 957,686 | Kalb |
| 3,852,162 | Light | 957,850 | Kalb |
| 3,192,130 | Potthorst | 2,059,415 | Germam |

Referring briefly to the disclosures of the more pertinent of the above-listed patents, it is noted that the German patent discloses the idea of forming bubles by introducing a gas into the body of a liquid below the level thereof and which bubbles detoxify spent lyes. It does disclose the production of an initimate mixture of gas and liquid by directing a continuous sharp jet of liquid on the surface of the liquid in a reservoir in such a way that the gas introduced in the vicinity of the jet is disintegrated into bubbles. Thus, it appears that the liquid is introduced into tank 1 by a conduit 10 and additional liquid under pressure is introduced through tube 8 onto the level of the liquid to form the bubbles. In accordance with this patent there is no concept of recycling a mixture of water vapor and gas in a closed circuit including a condenser and returning the gas from the condenser to the tank under moderate velocity which is dissipated by a baffle. Thus, gas appears to come from the pipe 8 but it appears that pressure of such gas would be so great as to disturb the level of the liquid in the tank, and there is certainly no baffle for dissipating such velocity.

In accordance with Light U.S. Pat. No. 3,565,767, a body of water 15 is shown as having an upper surface that is maintained at a constant level by a drainoff. This leaves an evaporating space 16 above the water level. Water is introduced into the evaporator 10 through tube 33 and air is introduced at the inlet 17. Water vapor is drawn off at the outlet 18. In accordance with this patent, there is no mixing chamber in which jets introduce water under pressure into a body of water the level of which is maintained substantially constant to form a multiplicity of bubbles which pass upwardly through the water body to the surface to entrain water in the form of vapor. It is also clearly lacking in any closed circulating system including a condenser from which air is returned to the tank under low pressure which is dissipated by a baffle in the tank.

In accordance with Light U.S. Pat. No. 3,852,162, air and water vapor are fed under pressure to the mingling chamber 10. The water vapor comes from a source 14 of condensible vapor while the gas which is air comes from the source 18. This patent does disclose a circulatory system including a condenser and air from the condenser mixes with air from the source 18 before it is introduced into the mingling chamber; however, this air is clearly under pressure which ordinarily would disturb the surface of the water in the mingling chamber and impair the function of bubbles which might be charged thereinto. This patent is clearly lacking in the concept of introducing recycled air at a velocity which is dissipated by impingement on a baffle.

OBJECTS OF THE INVENTION

With the foregoing conditions in mind, the present invention has in view the following objectives:

1. To provide a distilled water recovery system which includes a tank containing water at a constant level together with a nozzle for introducing a water jet into the body of water in the tank below the surface thereof to form a plurality of small bubbles which rise to the surface of the water and in so doing entrain water vapor together with a closed circulatory system for the mixture of air and water vapor and which includes a condenser;

2. To provide, in a distilled water recovery system of the type noted, a tube which extends from one end of the condenser to the tank above the jet nozzle therein together with means for dissipating the pressure of air that is recovered from the condenser and transported to the tank;

3. To provide, in a distilled water recovery system of the character aforesaid, a baffle which extends across the tank above the level of the water therein at a point closely adjacent to the end of the tube which transmits water from the condenser to the tank;

4. To provide, in a distilled water recovery system of the kind described, a tank having a pair of opposed end walls with the jet nozzle mounted in one end wall and an overflow drain at the opposite end wall for maintaining constant the level of water in the tank; and 5. To provide, in a distilled water recovery system of the type noted, a condenser having an outlet for distilled water.

Various other more detailed objects and advantages of the invention such as arise in connection with carrying out the above-noted ideas in a practical embodiment will in part become apparent and in part be hereinafter stated as the description of the invention proceeds.

SUMMARY OF THE INVENTION

The foregoing objects are achieved by providing a sparged air distilled water recovery system comprising a closed tank having a pair of opposed end walls with a jet nozzle for introducing water under pressure into a body of water in the tank below the surface thereof and an overflow drain in the opposite end wall for maintaining constant the level of water in the tank.

A closed circulatory system for a mixture of air and water vapor comprises a duct having one end mounted in the end wall in which the overflow drain is mounted and has an open end above the level of water in the tank together with a blower included in said duct between the tank and an end wall of a condenser. A second duct extends from the opposite end wall of the condenser to the end wall of the tank in which the jet nozzle is mounted and has an open end above the level of the water in the tank. A baffle extends across the tank above the level of the water therein in close proximity to the open end of the second duct.

An outlet for distilled water is mounted in the bottom of the condenser and extends to a receptacle or a place of useage for distilled water. With water in the tank at a desired level, water under pressure is introduced into this body of water below the surface thereof by the jet nozzle to form a plurality of bubbles below the surface of the water. These bubbles rise upwardly through the water and entrain water vapor. The mixture of this water vapor and air which is in the tank above the water level is drawn through the first duct by a blower and delivered to the condenser from which distilled water is drawn off and transported to a receptacle storage tank or place of useage for distilled water. Air from the condenser passes through said second duct and is introduced into the tank above the level of the water therein. This air will be under only slight pressure but this pressure is dissipated by the baffle. Thus the level of water in the tank is maintained constant and even to a reasonable degree so as to ensure that the bubbles pass through substantially the same thickness of the body of water throughout the area in which the bubbles pass to the upper surface.

For a full and more complete understanding of the invention, reference may be had to the following description and accompanying drawing, wherein:

FIG. 1 is a perspective of a distilled water recovery system embodying the precepts of this invention with a portion of the tank broken away to permit of illustration of the interior thereof; and FIG. 2 is a longitudinal vertical section through the tank depicting certain elements of the system diagrammatically.

DESCRIPTION OF A PREFERRED EMBODIMENT

Figure 1:
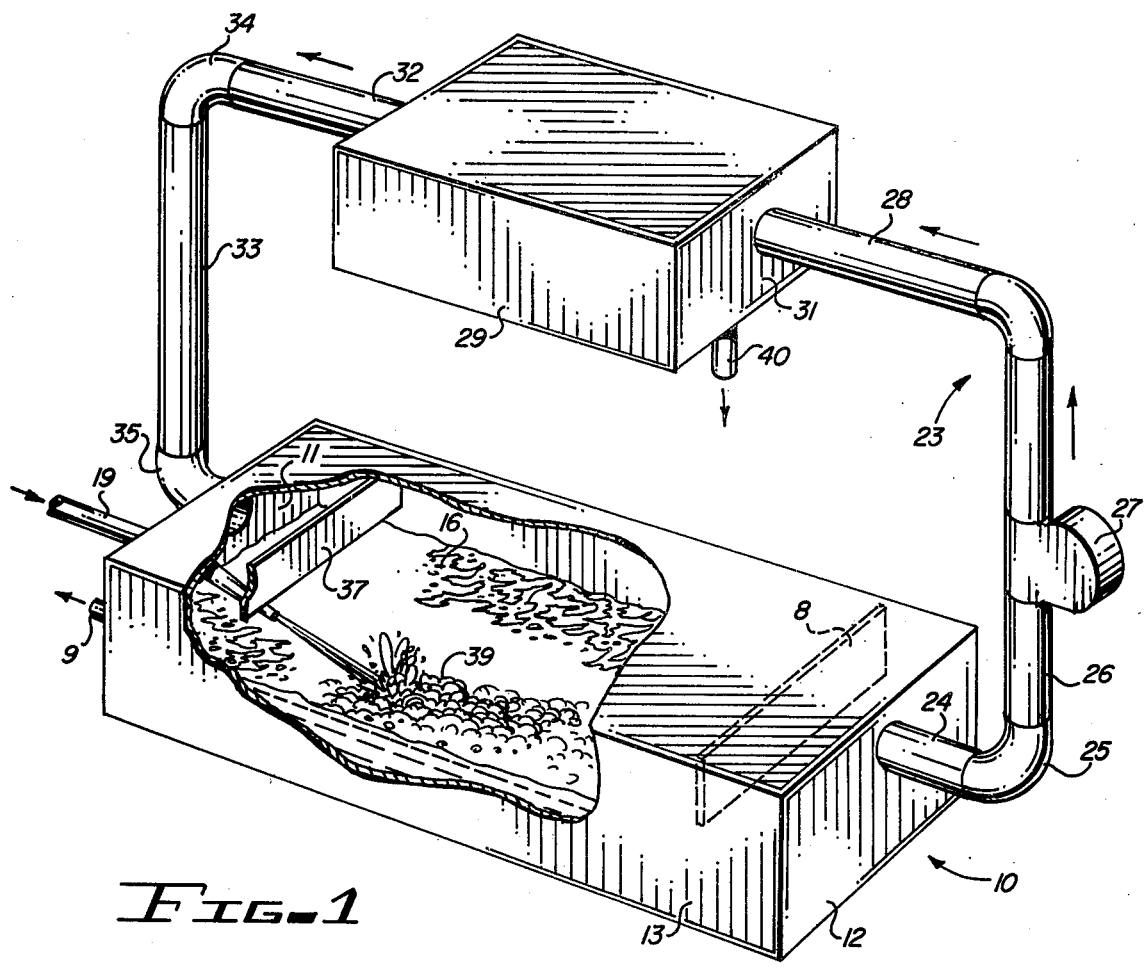

Referring now to the drawing, wherein like reference characters denote corresponding parts throughout the two views, a closed tank is designated 10. It is generally of rectangular formation and comprises a pair of opposed end walls 11 and 12, side walls 13, a top 14 and a bottom 15.

Tank 10 is shown as including a body of water 16 having an upper surface 17 which is spaced from top wall 14.

Figure 2:
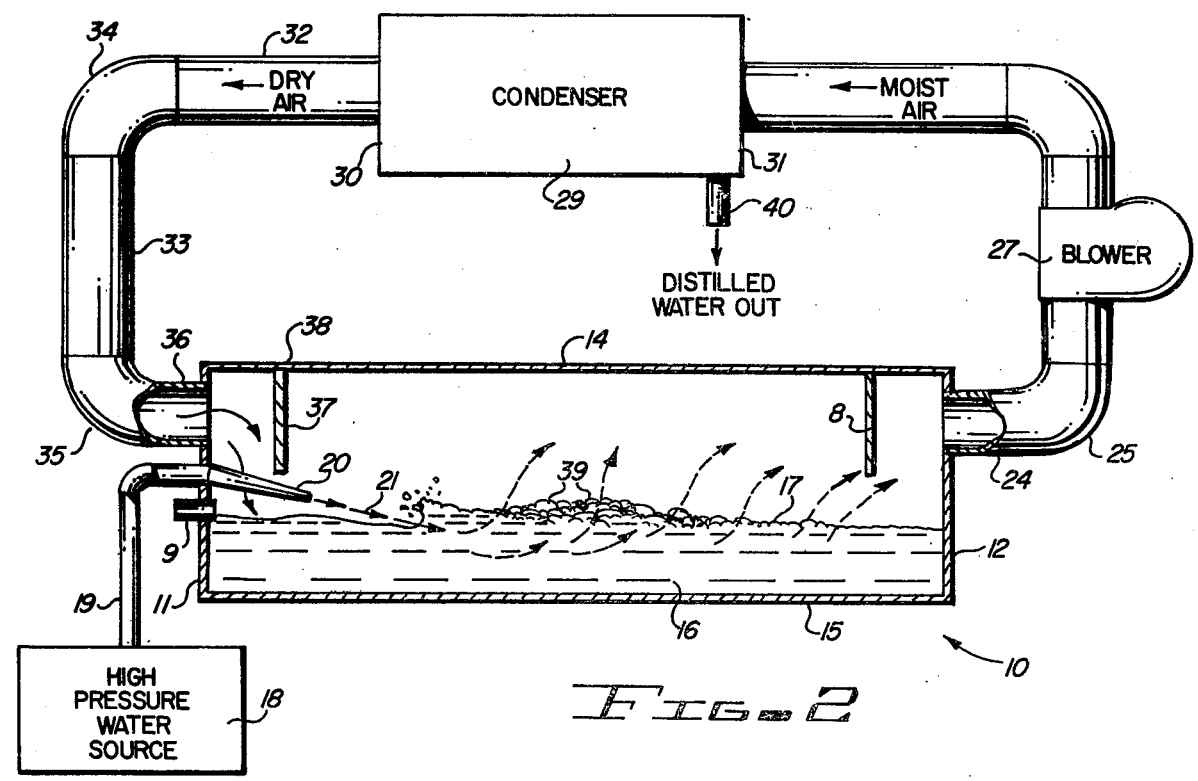

A high-pressure source of water is represented diagrammatically by the block 18 of FIG. 2. A conduit 19 extends from source 18 through an opening in end wall 11 and has a nozzle 20 connected thereto so that it extends from the end wall 11 into the interior of the tank. This nozzle 20 emits a jet stream of water represented by the arrows 21 in FIG. 2 which enters the water body 16 below the level 17.

An overflow drain 9 is mounted in end wall 11 and serves to maintain the water level 17 substantially constant. A closed circulatory system for water, vapor and air is referred to in its entirety by reference character 23. This closed system 23 comprises a duct 24 which is mounted in wall 12 above the water level 17 and in close proximity to the top wall 14. Duct 24 includes an elbow 25 from which upstands a vertical portion 26 in which a blower 27 is mounted. From vertical portion 26 of duct 24 an upper horizontal portion 28 extends to a condenser 29.

Condenser 29 has end walls 30 and 31 and the upper horizontal portion 28 of the duct enters the condenser 29 at end wall 31. From end wall 30 a second duct 32 extends. This duct 32 includes a vertical portion 33 which is connected to the upper horizontal portion of duct 32 by an elbow 34, and a second elbow 35 connects a lower portion 36 of the duct to vertical portion 33 with lower portion 36 opening into tank 10 above the water level 17 and closely adjacent to top wall 14.

A baffle 37 takes the form of a panel which extends between side walls 13 above the water level 17 with its upper edge being connected to top wall 14 of the tank at 38. This baffle 37 is spaced a slight distance from the open end of the lower duct portion 36.

OPERATION

While the mode of operation of the above apparatus is believed to be obvious from the illustration of the drawing and description of parts set forth above, it may be briefly outlined as follows:

The level of upper surface 17 of water body 16 is maintained substantially constant by overflow drain 9. A jet of water under high pressure is introduced by nozzle 20 into the water body 16 below the level 17 to form a plurality of bubbles which pass through the water body and appear on the surface 17. These bubbles are designated 39. As the bubbles 39 pass through the water body 16 they entrain water vapor so that the air in the space between top wall 14 and water level 17 becomes saturated with water vapor. With the blower 27 in operation this mixture of air and water vapor is drawn through duct 24 to condenser 29. From the latter distilled water is drawn through a nipple 40 which is mounted in the bottom wall of the condenser. Dry air from condenser 29 passes through the second duct 32 to the interior of tank 10, being discharged thereinto by the open end of portion 36 of the second duct. This air will be under only slight pressure but this pressure is dissipated by baffle 37 so that the water level 17 is maintained substantially even and free of irregularities except for the bubbles 39.

A second baffle 8 depends from top wall 14 in close proximity to the open end of duct 24. Baffle 8 prevents spray from entering duct 24.

While a preferred specific embodiment of the invention is hereinbefore set forth, it is to be clearly understood that the invention is not to be limited to the exact constructions, mechanisms and devices illustrated and described because various modifications of these details may be provided in putting the invention into practice.

What is claimed is:

1. In a distilled water recovery system:

(a) a tank having a pair of opposed end walls and containing a body of water having an upper surface;
(b) a jet nozzle mounted in one end wall for introducing a jet of water under high pressure into said body of water below said water level;
(c) an overflow drain in said one end wall for maintaining the water level in said tank at a constant depth with respect to the structure of the tank;
(d) a duct having one end mounted in the end wall in which said overflow drain is mounted and having an open end above said water level;
(e) a blower included in said duct;
(f) a condenser connected to said duct;
(g) a distilled water drawoff member mounted in said condenser;
(h) a second duct having one end connected to said condenser and its other end opening into said tank above said water level; and
(i) a baffle mounted in said tank above said water level and located in close proximity to the open end of said second duct.

2. The distilled water recovery system of claim 1 in which said tank is of substantially rectangular formation and includes a pair of spaced-apart end walls, a pair of spaced-apart side walls, a top wall and a bottom and in which the open ends of said ducts are located closely adjacent to the top wall of the tank.

3. The distilled water recovery system of claim 2 in which said baffle takes the form of a plate extending between said side walls, having an upper edge connected to said top wall and located in closely spaced relation to the open end of said second duct.

4. The distilled water recovery system of claim 2 in which said ducts, blower and condenser are included in a closed circulatory system for air and water vapor.

5. The distilled water recovery system of claim 4 in which each of said ducts includes a vertical portion and in one of which said blower is included, and both of said ducts including top horizontal portions connected to said condenser.

* * * * *